United States Patent
Kohl et al.

(10) Patent No.: US 11,048,427 B2
(45) Date of Patent: Jun. 29, 2021

(54) EVACUATION OF MEMORY FROM A DRAWER IN A LIVE MULTI-NODE SYSTEM

(71) Applicant: INTERNATIONAL BUSINESS MACHINES CORPORATION, Armonk, NY (US)

(72) Inventors: Jason D. Kohl, Austin, TX (US); Tim Bronson, Round Rock, TX (US); Hieu T. Huynh, Austin, TX (US); Michael Andrew Blake, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 192 days.

(21) Appl. No.: 16/280,641

(22) Filed: Feb. 20, 2019

(65) Prior Publication Data
US 2020/0264797 A1    Aug. 20, 2020

(51) Int. Cl.
*G06F 12/00*    (2006.01)
*G06F 3/06*    (2006.01)

(52) U.S. Cl.
CPC .......... *G06F 3/0647* (2013.01); *G06F 3/0604* (2013.01); *G06F 3/067* (2013.01); *G06F 3/0631* (2013.01)

(58) Field of Classification Search
CPC ...... G06F 3/0647; G06F 3/0631; G06F 3/067; G06F 3/0604
USPC ......................................................... 711/165
See application file for complete search history.

(56) References Cited

U.S. PATENT DOCUMENTS

| | | | |
|---|---|---|---|
| 8,321,636 | B2 | 11/2012 | Vantalon et al. |
| 8,667,207 | B2 | 3/2014 | Knowles et al. |
| 9,348,524 | B1 | 5/2016 | Bronson |
| 9,619,378 | B2 | 4/2017 | Bobroff et al. |
| 9,697,111 | B2 | 7/2017 | Yoo et al. |

(Continued)

FOREIGN PATENT DOCUMENTS

WO    03017107 A1    2/2003

OTHER PUBLICATIONS

Patil et al., "Dynamic Memory Allocation: Role in Memory Management", International Journal of Current Engineering and Technology, vol. 4, No. 2 (Apr. 2014). 5 pages. URL: https://www.researchgate.net/publication/265166374_Dynamic_Memory_Allocation_Role_In_Memory_Management/download.

*Primary Examiner* — Mardochee Chery
(74) *Attorney, Agent, or Firm* — Cantor Colburn LLP; William Kinnaman

(57) ABSTRACT

Methods, systems and computer program products for evacuating memory from a drawer in a live multi-node system are provided. Aspects include placing a first drawer into an evacuation mode. The evacuation mode includes a cessation of non-evacuation operations and provides for a transfer of data stored by memory of the first drawer to a destination drawer using dynamic memory reallocation (DMR). Aspects also include transmitting a store request by the first drawer to the destination drawer. The store request represents a request to transfer the data stored by the memory of the first drawer to the destination drawer for storage by the destination drawer. Aspects also include transmitting the data stored by the memory of the first drawer to the destination drawer. The data is transmitted by the first drawer using a local pool of fetch/store controllers.

20 Claims, 8 Drawing Sheets

(56) References Cited

U.S. PATENT DOCUMENTS

| | | | |
|---|---|---|---|
| 9,880,768 B2 | 1/2018 | Bosshart | |
| 2004/0215773 A1* | 10/2004 | Strait | ........................ G06F 9/50 709/225 |
| 2004/0230751 A1* | 11/2004 | Blake | .................. G06F 12/0831 711/147 |
| 2016/0139831 A1* | 5/2016 | Bronson | .................. G06F 3/065 711/118 |

* cited by examiner

EVACUATION OF MEMORY FROM A DRAWER IN A LIVE MULTI-NODE SYSTEM

BACKGROUND

The present invention generally relates to dynamic relocation of storage, and more specifically, to evacuating memory from a drawer in a live multi-node system.

In certain computing systems and architectures, main memory is a primary resource that hypervisors manage on behalf of logical partitions, or guest operating systems. Similar to compute resources, main memory is limited in size and the main memory needs of a logical partition or operating system may change over time. To better utilize the shared memory resources of a computer system, advanced hypervisors and computer systems support dynamic (i.e., while a partition is active) allocation and de-allocation of storage in fixed size increments. The hypervisors are formed of low-level machine code that runs on processors to manage allocations of logical partitions in terms of dispatching logical processors associated with the partitions as well as the allocation of memory to the logical partitions.

While the means to move logical partitions between different physical compute resources exists, main memory cannot be relocated between physical partitions (e.g., nodes/drawers) for an active logical partition without first disrupting the partition. Typically, a disruption can mean either suspending the partition or the entire system while performing the relocation. Thus, since main memory associated with an active logical partition cannot be moved non-disruptively, optimal resource allocation over time is not obtained and in fact memory resource allocation may become suboptimal over time as compute and memory resource demands change.

SUMMARY

Embodiments of the present invention are directed to a computer-implemented method for evacuating memory from a drawer in a live multi-node system. A non-limiting example of the computer-implemented method includes placing a first drawer into an evacuation mode. The evacuation mode includes a cessation of non-evacuation operations and provides for a transfer of data stored by memory of the first drawer to a destination drawer using dynamic memory reallocation (DMR). The first drawer includes a local pool of fetch/store controllers configured to interact with a group of remote fetch/store controllers of the destination drawer, a first group of remote fetch/store controllers configured to interact with a local pool of fetch/store controllers of the destination drawer, and a second group of remote fetch/store controllers configured to interact with a local pool of fetch/store controllers of a second drawer. The method also includes transmitting a store request by the first drawer to the destination drawer. The store request represents a request to transfer the data stored by the memory of the first drawer to the destination drawer for storage by the destination drawer. The method also includes transmitting the data stored by the memory of the first drawer to the destination drawer. The data is transmitted by the first drawer using the local pool of fetch/store controllers.

Embodiments of the present invention are directed to a system for evacuating memory from a drawer in a live multi-node system. The system includes a memory having computer readable computer instructions, and a processor for executing the computer readable instructions. The computer readable instructions include instructions for placing a first drawer into an evacuation mode. The evacuation mode includes a cessation of non-evacuation operations and provides for a transfer of data stored by memory of the first drawer to a destination drawer using dynamic memory reallocation (DMR). The first drawer includes a local pool of fetch/store controllers configured to interact with a group of remote fetch/store controllers of the destination drawer, a first group of remote fetch/store controllers configured to interact with a local pool of fetch/store controllers of the destination drawer, and a second group of remote fetch/store controllers configured to interact with a local pool of fetch/store controllers of a second drawer. The computer readable instructions also include instructions for transmitting a store request by the first drawer to the destination drawer. The store request represents a request to transfer the data stored by the memory of the first drawer to the destination drawer for storage by the destination drawer. The computer readable instructions also include instructions for transmitting the data stored by the memory of the first drawer to the destination drawer. The data is transmitted by the first drawer using the local pool of fetch/store controllers.

Embodiments of the invention are directed to a computer program product for evacuating memory from a drawer in a live multi-node system, the computer program product comprising a computer readable storage medium having program instructions embodied therewith. The computer readable storage medium is not a transitory signal per se. The program instructions are executable by a processor to cause the processor to perform a method. A non-limiting example of the method includes placing a first drawer into an evacuation mode. The evacuation mode includes a cessation of non-evacuation operations and provides for a transfer of data stored by memory of the first drawer to a destination drawer using dynamic memory reallocation (DMR). The first drawer includes a local pool of fetch/store controllers configured to interact with a group of remote fetch/store controllers of the destination drawer, a first group of remote fetch/store controllers configured to interact with a local pool of fetch/store controllers of the destination drawer, and a second group of remote fetch/store controllers configured to interact with a local pool of fetch/store controllers of a second drawer. The method also includes transmitting a store request by the first drawer to the destination drawer. The store request represents a request to transfer the data stored by the memory of the first drawer to the destination drawer for storage by the destination drawer. The method also includes transmitting the data stored by the memory of the first drawer to the destination drawer. The data is transmitted by the first drawer using the local pool of fetch/store controllers.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
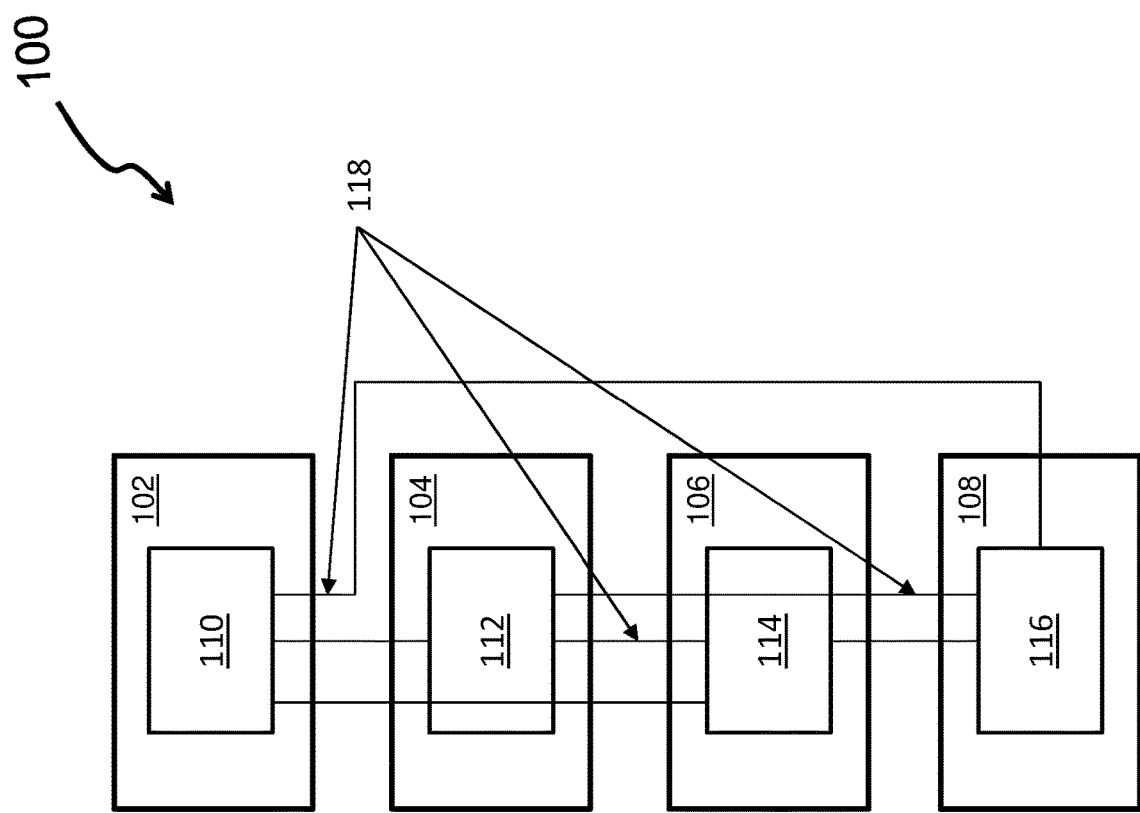
FIG. 1 depicts a block diagram of a distributed symmetric multiprocessing (SMP) system in accordance with one or more embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

As will be appreciated by those of skill in the art, Dynamic Memory Reallocation (DMR) operations allow a system to move data stored on one memory node (e.g., memory on a source drawer) to another memory node (e.g., memory on a destination drawer) in a system during operation of the system. While the system is running and there are workloads on each node, it is generally more efficient for the destination node to perform the operation that will move the data stored in memory from the source node. When the destination node performs the operation, it will need to fetch each cache line of stored data from memory. For example, the destination node may fetch the stored data from the source memory, or from another node in the system where the line exists in cache in a modified or potentially modified state. In either case, one inter-node transfer of the data is required to bring the memory to the destination node. When the source node performs the memory move operation, it may find the line in cache stored in memory of the source node, which will require one inter-node transfer of the data to the destination node. However, it is also possible that the line exists in a modified or potentially modified state on another node, in which case the operation must fetch the line from the off-node cache, transfer it to the source node, and then complete the transfer to the destination node. Thus, generally speaking in cases of normal system operation, when the data transfer is executed by the destination node, a smaller maximum number of transfers is needed, and the transfer of data can be performed more efficiently both in time and in inter-node bandwidth.

However, in some cases, the system may experience abnormal conditions or states that may have a potential impact on DMR operations. For example, in some cases, one node (e.g., drawer) of the system may be in a state of being evacuated so that it can be repaired or replaced if, for example, some defect arises in the node that causes the node to malfunction. When in this state, the node may be referred to as being in an "evacuation mode." According to some embodiments, when a node is in an evacuation mode, new operations on the evacuating node are disallowed, and ongoing operations are allowed to finish, resulting in a state in which the node's outgoing data buses are unused, and controllers responsible for local fetch and store operations are idle. According to embodiments of the invention, the systems, methods and techniques described herein may take advantage of the resources available in this state, instead of taxing resources elsewhere in the system, which are still attempting to operate normally.

In general, when a node is in an evacuation mode, the goal is to move all memory stored on the evacuating node elsewhere in the system (i.e., to one or more of the other nodes), so that the data stored by the evacuating node may be preserved by a live node before repair or replacement of the evacuating node may commence. Due to the difference in size of memory and cache (with memory usually being 3 or more orders of magnitude larger), the vast majority of the data that needs to be moved off of the drawer does not exist in cache either on the evacuating node or other nodes. Therefore, the operation is equally efficient with regard to inter-node traffic, as exactly one transfer will be required (i.e., a transfer from the evacuating node to the destination node). In a small number of cases, there may be data that exists in cache on another node that must be fetched before it is transferred to the destination node. However, the inter-node data buses from the source node to the evacuating node, and from the evacuating node to the source node are otherwise unused, as other operations have been halted. By performing this operation on the evacuating node, there is less demand on the data buses directly connecting the source and destination nodes.

Under normal operation, memory move operations are often limited in order to not monopolize resources, including fetch and store controllers and data buses that may be used by other operations. In an evacuating node, there is low or no other demand for these resources, so there is no reason to throttle the memory move operations. In this mode, the structure responsible for launching the memory move operations may do as many as possible at once, and may proceed with the next as fast as possible. According to embodiments of the present invention, significantly more operations may be performed at once by using this improvement. Additionally, because the operations are being performed on the evacuating node, there are no other operations competing for actions in the pipeline nor competing for space on the data buses. This also leads to performance improvements as there is nothing to slow down the memory move operations.

Embodiments of the present disclosure may utilize existing memory interfaces, controllers and data buses to perform memory move operations by the evacuating node. The system utilizes controllers for fetching data, controllers for storing data, and interfaces between nodes in a system along which to send data. Each node (i.e., drawer) of the system may include a cache and memory. Embodiments of the invention include software/firmware that can choose to perform the memory move operations as designed, as well as hardware in the cache that supports this mode of operation. According to some embodiments, the hardware may receive a signal that provides an indication that it should place a node into an evacuation mode and perform memory move operations as described herein. Once in evacuation mode, the evacuating node may use the additional controller resources as described herein to perform the memory move operations. By performing the memory move operations from the evacuating node (instead of another node in the system), they system may use otherwise unutilized resources to perform the memory move operations more quickly, while freeing up other resources for other uses. Furthermore, these memory move operations can be allowed to be executed by the evacuating node, even while other operations on the evacuating node are prohibited.

Turning now to an overview of technologies that are more specifically relevant to aspects of the invention, in modern multi-processor computer systems, a hierarchy of caches is used to buffer memory cache lines in order to reduce the access time overhead of data in memory. Highly distributed, large symmetric multiprocessing (SMP) systems can share high-level cache (e.g., L4 cache). Prior SMP systems required tradeoffs to be made between the amount of available IA cache and the level of connectivity between processors to accommodate cost and packaging constraints. SMP systems can include multiple drawers, where each drawer contains two or more independent and separate nodes. These nodes in turn each contain multiple central processing (CP) chips (e.g., integrated circuits) connected together with a dedicated shared cache (SC) chip. Each CP chip is a chip multiprocessor (CMP) with a private L1 and L2 cache per processor and one L3 cache shared by all the processors on the chip. The SC chip includes an L4 cache and system interconnect logic.

Turning now to a more detailed description of aspects of the present invention, FIG. 1 depicts a distributed symmetric multiprocessing (SMP) system 100 (hereafter "system 100") in accordance with one or more embodiments. According to some embodiments, system 100 can include 4 processing units, nodes or "drawers." In some embodiments, system 100 can include 5 processing units, nodes or drawers that would include similar connections to those shown in FIG. 1. Each drawer of system 100 can connect to the other drawers of the system 100. For example, as shown in FIG. 1, drawer 102 (described in greater detail with respect to FIG. 2) connects to drawer 104, drawer 106, and drawer 108 via a shared cache (SC) chip (sometimes referred to as an integrated circuit (IC)) 110. Drawers 104, 106, and 108 each have a respective SC chip (e.g., SC chip 112, SC chip 114, SC chip 116). Bus lines 118 connect drawers 102, 104, 106, and 108. Intra-drawer coherency communication may be performed using pass-through and a combination of these bus-lines, 118.

In an embodiment, cache lines that are owned or shared by processors of an entity at a level of coherency (cluster, CP Chip, drawer) are candidates to be handled at the level of coherency. Thus, if a processor of the entity requests ownership or sharing of a line that is already owned by a processor of the same entity (e.g., CP Chip or drawer), the entity need not access other entities to handle the request coherently. A request, for example, by a processor of a CP chip within a CP cluster, for sharing of a cache line is examined by memory controller function to determine if the line is owned or shared by a processor of CP cluster. If it is already owned or shared, the memory controller handles the request within the CP cluster without accessing any other CP clusters. If the line is neither owned nor shared by a processor of CP cluster, the memory controller of the initial CP Cluster performs a cache coherency operation with the other CP chips on the other CP clusters connected to that SC chip or on the other drawers via the SC chips on those drawers.

Figure 2:
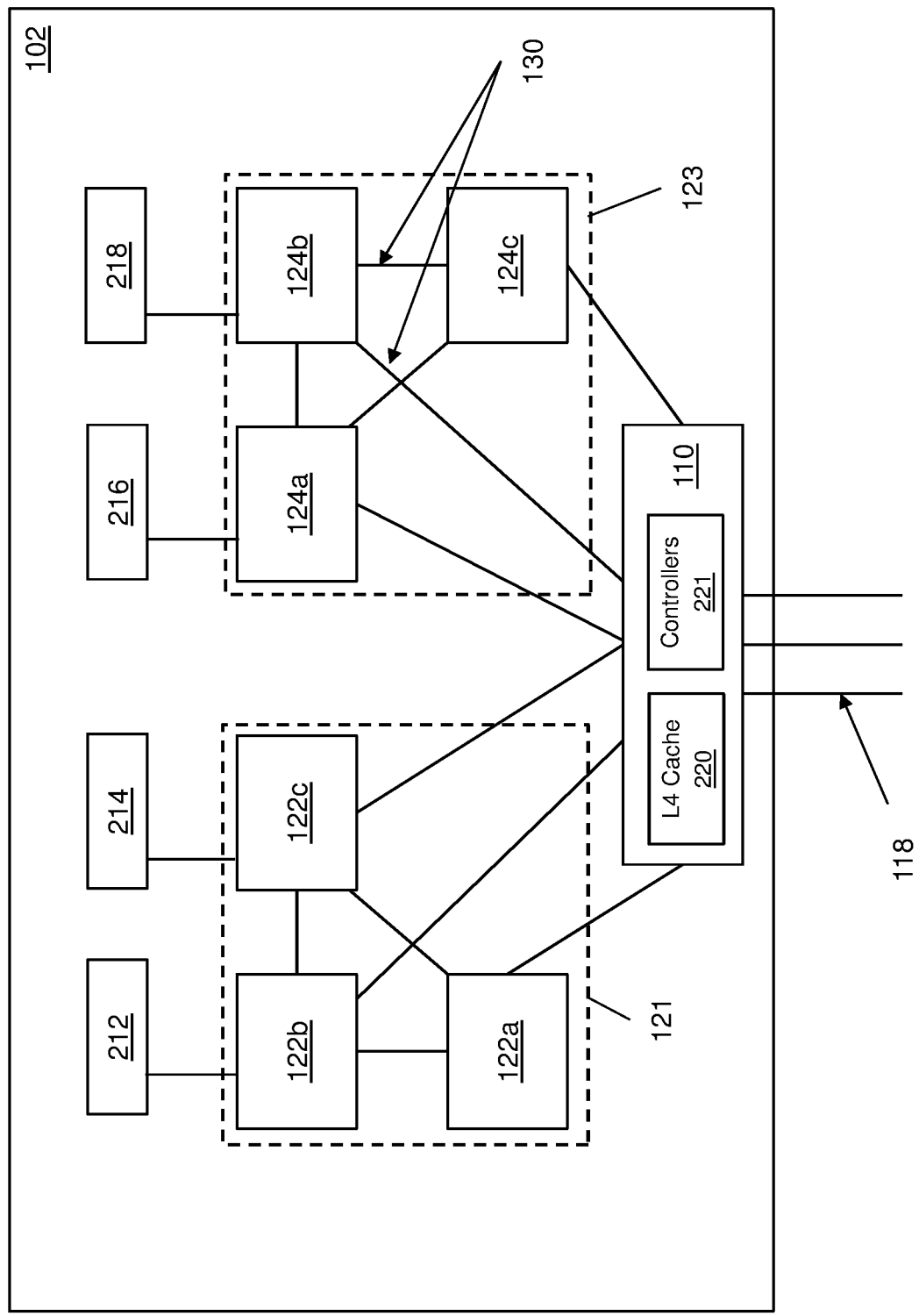
FIG. 2 depicts a block diagram of a drawer in a distributed symmetric multiprocessing (SMP) system in accordance with one or more embodiments of the invention.

FIG. 2 depicts drawer 102 in greater detail, according to one or more embodiments. Although FIG. 2 depicts only drawer 102, it should be appreciated that a similar configuration is contemplated for drawers 104, 106, and 108, and/or other drawers in system 100. Referring now to FIG. 2, drawer 102 includes two CP clusters (e.g., CP cluster 121 and CP cluster 123). Each CP cluster contains individual CP chips. For example, CP cluster 121 contains CP chips 122a, 122b, and 122c; and CP cluster 123 contains CP chips 124a, 124b, and 124c. Each of the individual CP chips (e.g., CP chips 122a, 122b, 122c, 124a, 124b, 124c) has multiple processing cores (e.g., 2 processing cores, 8 processing cores, 10 processing cores, etc.) and each processing core has its own private L1 and L2 cache. The processing cores within each individual CP chip share an L3 cache at the CP level. For example, the CP 122a includes multiple processing cores that each has its own L 1/L2 cache and the multiple processing cores within the CP 121 share an L3 cache. Each respective CP chip may be connected to system memory (e.g., system memory 212, system memory 214, system memory 216, and system memory 218). CP chip 121 is operatively connected with each of the other clusters (e.g., 123) via bus lines 130 through the SC chip 110. In other aspects, a CP cluster may include any number of CP chips, although embodiments are described as having only three.

The SC chip 110 includes interconnects for communication with each CP chip (e.g., CP chips 122a, 122b, 122c, 124a, 124b, 124c) in both clusters 121, 123 on the drawer 102 and for communication with other SC chips on other drawers (e.g., the SC 112 of the drawer 104, the SC 114 of the drawer 106, the SC 116 of the drawer 108, etc.). In one or more embodiments of the invention, the SC chip 110 includes an L4 cache 220 and directory that includes the L4 cache and a directory of the state bits. According to some embodiments, the SC chip 110 can include a plurality of controllers 221. For example, in some embodiments, the SC chip can include a local pool of fetch/store controllers that are configured to receive and execute instructions from one or more CP chips (e.g., CP chips 122a, 122b, 122c, 124a, 124b, 124c) on the drawer. Fetch/store controllers can collectively refer to both fetch controllers that are configured to fetch a line of data from cache or memory and to store controllers that are configured to store data to memory or to another drawer. According to some embodiments, any controller of the local pool of fetch/store controllers can be used to execute instructions originating from any CP chip that resides on the same drawer. The local pool of fetch/store controllers may be configured to interact with one or more groups of remote fetch/store controllers associated with one or more other drawers. According to some embodiments, the plurality of controllers 221 can also include one or more groups of remote fetch/store controllers that are configured to interact with one or more local pools of fetch/store controllers disposed on one or more respective other drawers. For example, a group of remote fetch/store controllers can be configured to receive and execute instructions that originate from another drawer (e.g., instructions that originate from a local pool of fetch/store controllers of another drawer). Each group of remote/store controllers may be configured to only execute instructions originating from the local pool of fetch/store controllers of one other drawer. For example, a first group of remote fetch/store controllers may be configured to receive and execute instructions from a local pool of fetch/store controllers of a first other drawer, a second group of remote fetch/store controllers may be configured to receive and execute instructions from a local pool of fetch/store controllers of a second other drawer, and so on, such that each group of remote fetch/store controllers is dedicated to handling instructions (e.g., performing fetching and storing operations) that originate from a particular other drawer. Further, the local pool of fetch/store controllers disposed on the SC chip 110 of a subject drawer may be configured to issue instructions to a group of remote fetch/store controllers residing on each of the other drawers. As will be described in greater detail below, when a drawer is in an evacuation mode, the plurality of controllers 221 may be used to transfer data out of system memory 212, 214, 216, 218 to the memory of one or more other drawers.

Although not pictured, according to some embodiments, the SC chip 110 may include a plurality of DMR engines that are software modules that coordinate the mass memory move. In some embodiments, a DMR engine can be a specialized hardware module that is configured to coordinate the mass memory move. For example, a DMR engine can be configured to receive an instruction to perform a DMR operation for a larger piece of memory (e.g., a page or a segment that can be approximately 100-10,000 lines) and then the DMR engine can send individual instructions to each fetch/store controller(s) for one cache line at a time. Thus, according to some embodiments, each DMR engine may generate the individual operations to be executed by the local fetch/store controllers. Embodiments of the present invention include a large number of DMR engines that perform DMR operations include in order to take advantage of the number of local controllers that are available on an evacuating drawer. For example, according to some embodiments, the system may include 1 DMR engine per every 5 fetch/store controllers. A DMR engine can start a first line move and then begin a second line move while the first line move is still in progress (e.g., in the fetch/store controllers). According to some embodiments, the ratio of DMR engines to fetch/store controllers may depend on the time required to launch a line command to the time required to complete the line command, which may depend on the communication time between drawers.

Figure 3:
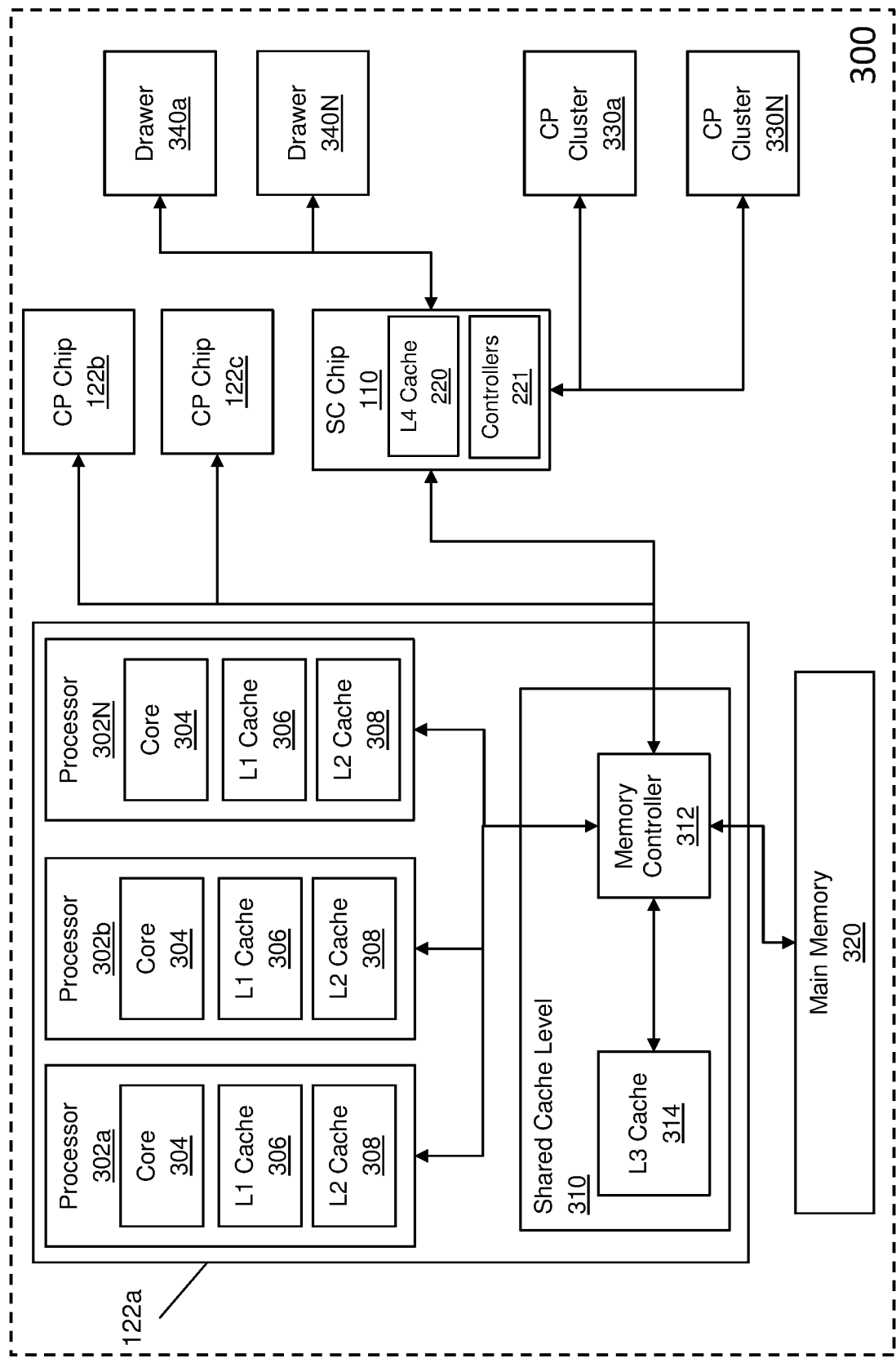
FIG. 3 depicts a block diagram of an exemplary symmetric multiprocessor (SMP) computer according to one or more embodiments of the invention.

FIG. 3 depicts a block diagram of an exemplary symmetric multiprocessor (SMP) computer according to one or more embodiments of the present invention. The system 300 includes several CP clusters 330a-330N (where N is any whole number greater than 2) which may be directly connected or connected through other SC chips. As described in FIG. 2, each CP cluster includes three CP chips. CP chip 122a is depicted in greater detail in FIG. 3. CP chip 122a includes processors 302a-302N (where N is any whole number greater than 2). Each processor has one or more cores 304, an L1 cache 306, and an L2 cache 308. Each processor within the CP chip 122a is communicative coupled to a memory controller 312 on a shared cache level 310. The memory controller 312 can access the L3 cache 314. In one or more embodiments, each of the processors 302a-302N share the L3 cache on the CP chip 122a. The memory controller 312 with the L3 cache implements a shared cache level 310 across a CP cluster in the system 300.

The main memory 320 can include a random access store of program data and program instructions for data processing on the system 300. Main memory 320 is characterized by memory latency, the time required for a memory access, a read or write to or from main memory.

The L1 cache 306 and L2 cache 308 along with the L3 cache 314 are specialized segments of memory used by the processors 302a-302N to reduce memory access latency. Each cache is smaller and faster than main memory 320, and each cache stores copies of data from frequently used main memory locations. When a processor needs to read from or write to a location in memory, it first checks whether a copy of that data, a "cache line," is in a cache.

In the examples of FIG. 3, when a processor 302a on CP chip 122a in CP cluster 121 (from FIG. 2) experiences a cache miss for a cache line in the L3 cache 314, which of course follows a cache miss on L1 306 and L2 308, the memory controller 312 broadcasts to the other CP chips 122b, 122c and the SC Chip 110 a coherency request for the cache line. The SC Chip 110 checks its L4 cache 220 and if necessary also looks to the other CP clusters 330a . . . 330N and the other drawers 340a . . . 340N check for the cache line in their respective L3 and L4 cache. If either of the CP chips 122b, 122c or the SC Chip 110 does have the line it will be returned from one of these locations. If neither the other CP chips 122b, 122c or the SC Chip 110 have the cache line, the memory controller 312 requests the cache line from the other cache levels on other clusters or drawers that does have it. At this point in processing, if the memory controller 312 cannot retrieve the cache line from the other Drawers 340a . . . 330N or CP Clusters 330a . . . 330N, it would be forced to retrieve the cache line from main memory.

Figure 4:
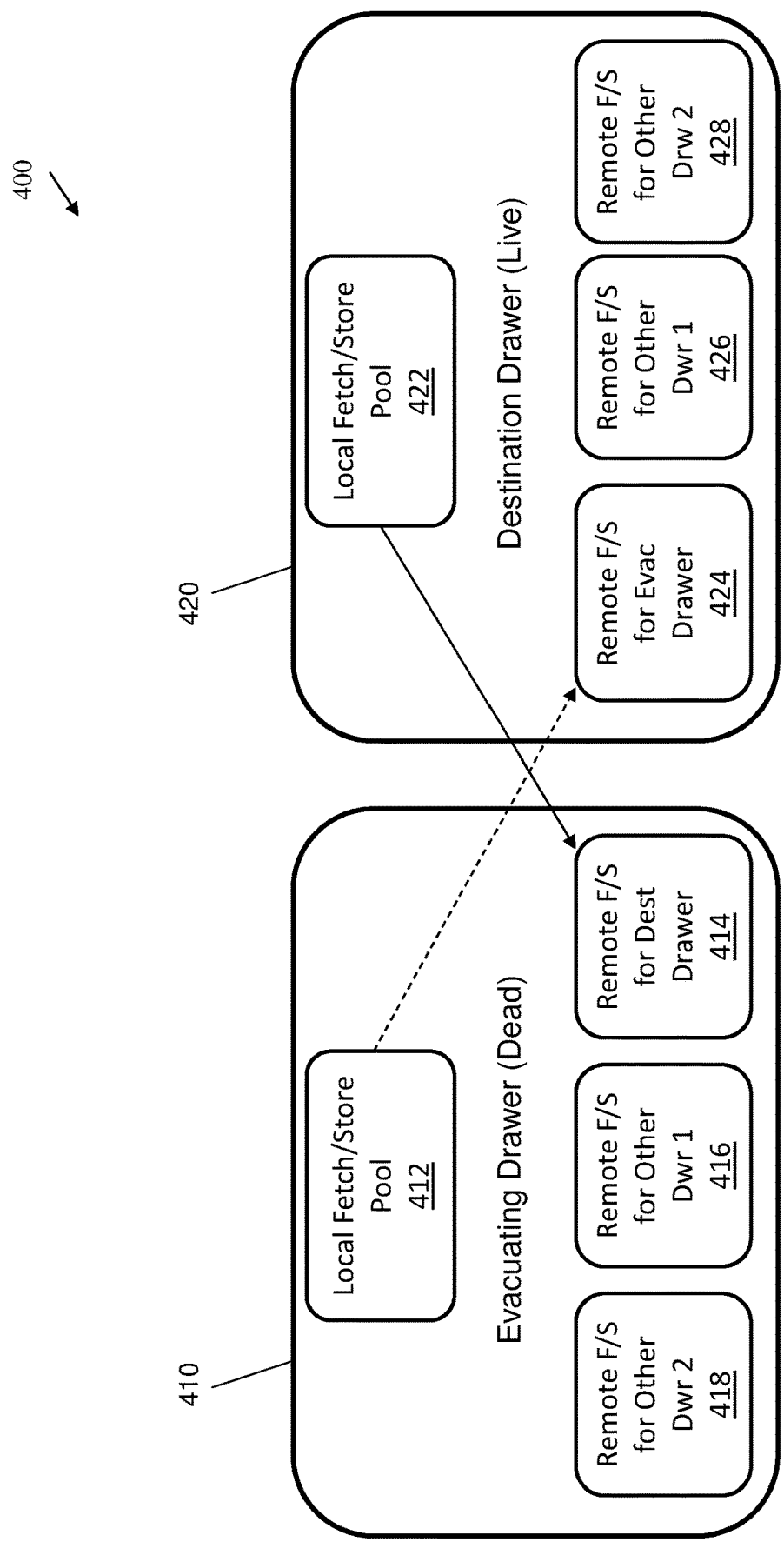
FIG. 4 depicts a block diagram displaying communication between fetch/store controllers of an evacuation drawer and a destination drawer according to one or more embodiments of the invention.

Turning now to FIG. 4, a block diagram 400, which shows the communication between fetch/store controllers of an evacuation drawer 410 and a destination drawer 420 during an evacuation of data from the evacuation drawer 410 to the destination drawer 420 that can occur during memory move operations/DMR. The evacuating drawer (aka, "dead drawer") 410 may include a local pool of fetch/store controllers 412 for executing instructions that originate on the dead drawer 410, a first group of remote fetch/store controllers 414 that are dedicated to executing instructions originating from the destination drawer 420, a second group of remote fetch/store controllers 416 that are dedicated to executing instructions originating from a first other drawer, and a third group of remote fetch/store controllers 418 that are dedicated to executing instructions originating from a second other drawer. Similarly, the destination drawer (aka, "live drawer") 420 may include its own local pool of fetch/store controllers 422 for issuing instructions to the first group of remote fetch/store controllers 414 of the dead drawer 410, a first group of remote fetch/store controllers 424, a second group of remote fetch/store controllers 426, and a third group of remote fetch/store controllers 428 which are dedicated to executing instructions originating from the dead drawer 410, a first other drawer and a second other drawer, respectively. According to some embodiments, a system 100 may include five drawers, in which case the evacuating drawer 410 and the live drawer 420 would each include a fourth group of remote fetch/store controllers that are dedicated to executing instructions originating from a third other drawer. As shown in the example in FIG. 4, during a memory move operation, the memory move operations may be carried out by the local pool of fetch/store controllers 422 of the destination drawer 420, which may issue instructions to the first group of remote fetch/store controllers 414 of the evacuating drawer 410, which may in turn fetch the data from memory of the evacuating drawer 410 and transmit it to the destination drawer 420. The second and third groups of remote fetch/store controllers 416, 418 may be used to carry out memory move (i.e., DMR) instructions issued by a first and second other drawer, respectively, however the local pool of fetch/store controllers 412 of the evacuating drawer (as well as the first group of remote fetch/store controllers 424 of the destination drawer 420) would be idle. This represents a large inefficiency as in many embodiments, the local pool of fetch/store controllers 412 is significantly larger than the first group of remote fetch/store controllers 414, meaning that a large amount of processing power is idle, and secondly, the local pool of fetch/store controllers 422 of the live drawer 420 is simultaneously used for other non-DMR functions, so the use of these controllers for memory move operations reduces the available processing the live drawer 420 is able to carry out with respect to other operations.

Figure 5:
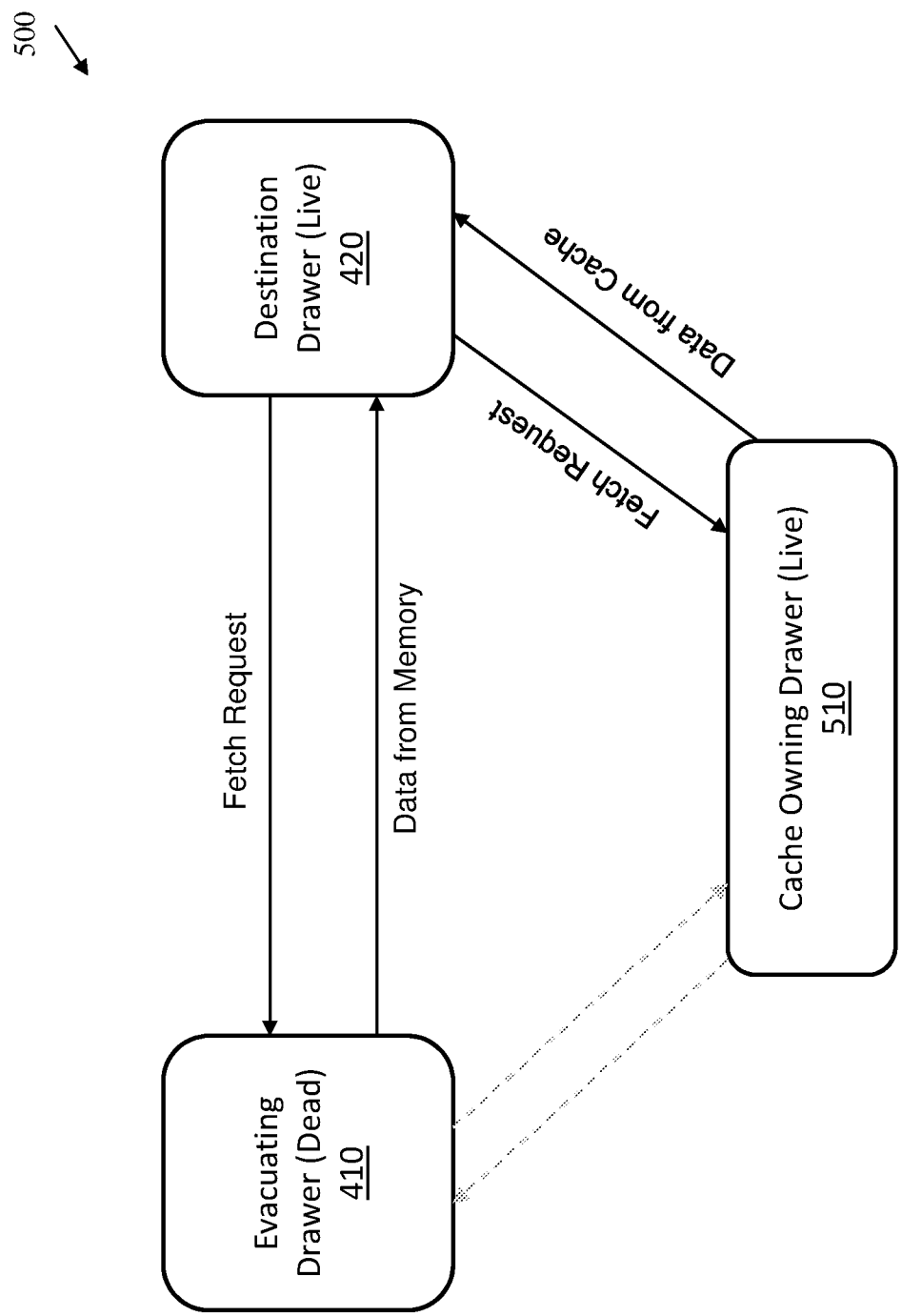
FIG. 5 depicts a block diagram displaying bus usage between drawers during a drawer evacuation according to one or more embodiments of the invention.

This method of performing a memory move/DMR operation shown in FIG. 4 is also reflected in the block diagram 500 of FIG. 5, which shows that the destination drawer 420 can issue a fetch request to the evacuating drawer 410 and a cache owning drawer 510 and then can receive data from each. In some situations, the cache owning drawer 510 may be another drawer that stores a modified version of the data stored in memory on the evacuating drawer 410 in its cache, so that the destination drawer 420 can receive the most up-to-date version of data. As shown in FIG. 5, although the evacuating drawer 410 and the cache owning drawer 510 are connected, the bus connecting the evacuating drawer 410 to the cache owning drawer 510 would be idle during these DMR operations, which is wasteful. Further, the destination drawer 420 may have other non-DMR operations that it may need to carry out in conjunction with the cache owning drawer 510, but usage of the bus between the destination drawer 420 and the cache owning drawer 510 for DMR operations reduces the available bandwidth for communications between the destination drawer 420 and the cache owning drawer 510 for performing non-DMR operations.

Figure 6:
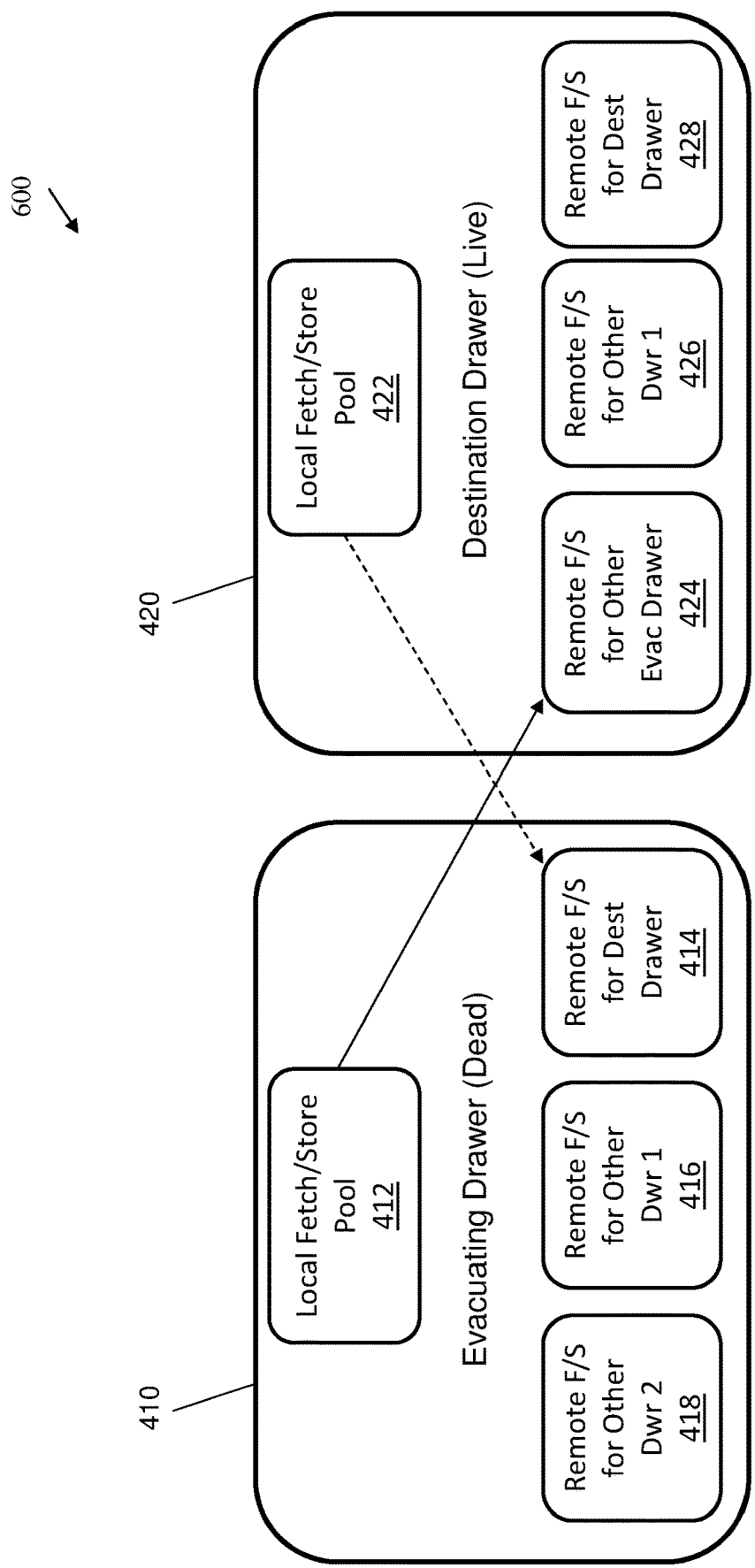
FIG. 6 depicts another block diagram displaying communication between fetch/store controllers of an evacuation drawer and a destination drawer according to one or more embodiments of the invention.

FIG. 6 shows a block diagram 600 that shows the communication between fetch/store controllers of an evacuation drawer 410 and a destination drawer 420 during an evacuation of data from the evacuation drawer 410 to the destination drawer 420, according to embodiments of the invention. As shown in FIG. 6, according to embodiments of the invention, when the evacuating drawer 410 is in an evacuation mode, instead of initiating memory move/DMR operations by the destination drawer 420 (as shown in FIG. 4), the system instead uses the otherwise idle local pool of fetch/store controllers 412 of the evacuating drawer 410 to perform the memory move operations in conjunction with the first group of remote fetch/store controllers 424 of the destination drawer 420. In this case, the first, second and third groups of remote fetch/store controllers of the evacuating drawer are now unused, but they have no value to non-DMR operations. By contrast, the local pool of fetch/store controllers 422 of the destination drawer 420 are also unused for DMR operations, however these controllers generally have other non-DMR operations to perform, and thus embodiments of the invention allow for memory move operations to occur while freeing up processing resources at the destination drawer 420. Furthermore, the memory move operations can be performed faster than they would be in the case shown in FIG. 4, because the local pool of fetch/store controllers 412 of the evacuating drawer 410 is much larger than the first group of remote fetch/store controllers 414, thereby allowing it to process and move data much faster and using resources that would have otherwise been idle.

Figure 7:
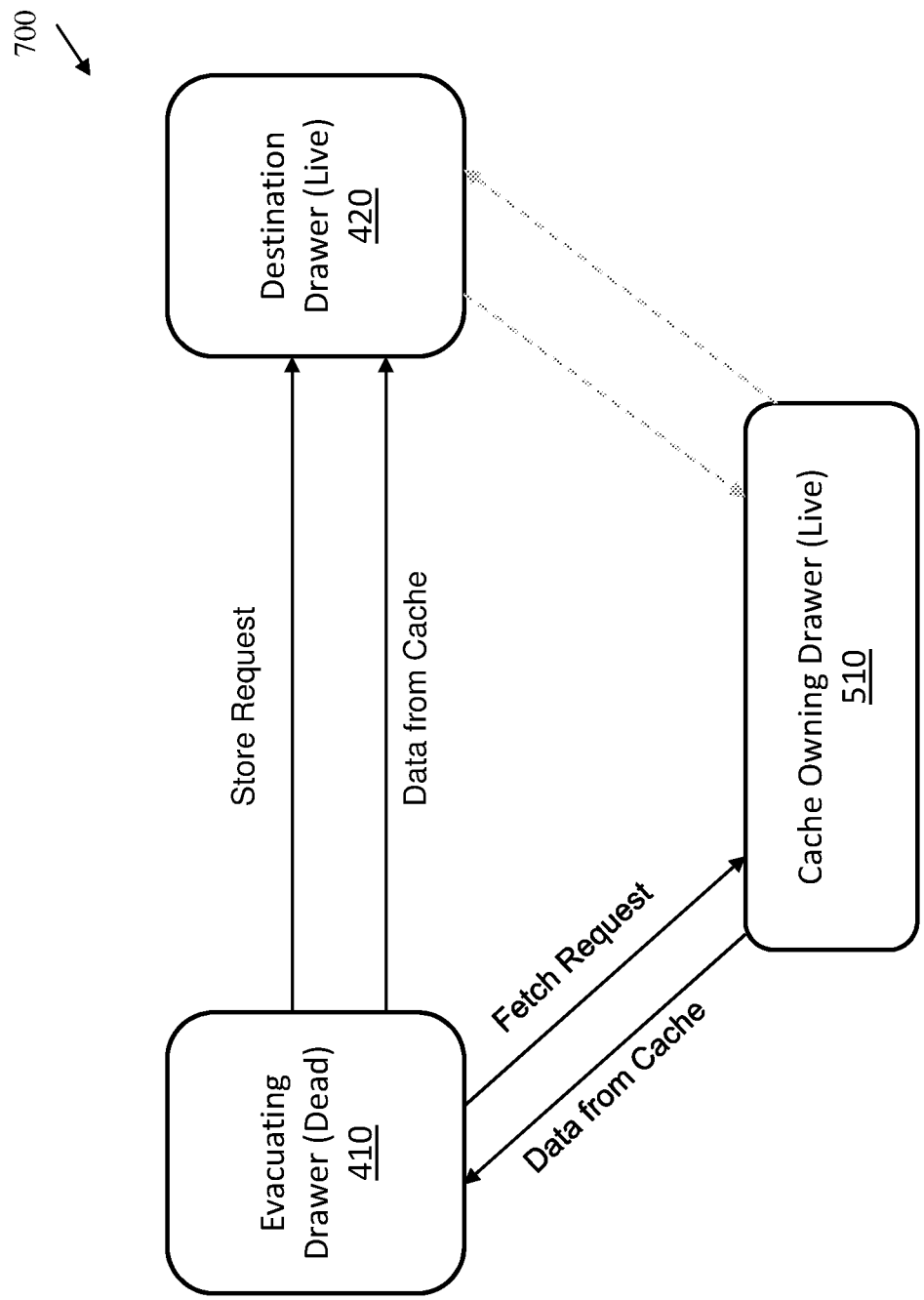
FIG. 7 depicts another block diagram displaying bus usage between drawers during a drawer evacuation according to one or more embodiments of the invention.

This process described with respect to FIG. 6 is also illustrated by block diagram 700 in FIG. 7, which shows that according to embodiments of the invention, when in an evacuation mode, the evacuating drawer 410 may send a store request to the destination drawer 420 and a fetch request to a cache owning drawer 510 (to the extent any modified versions of data 410 stored by the evacuating drawer are stored by the cache owning drawer 510). For example, in some embodiments, one or more local controllers 412 of the evacuating drawer 410 may broadcast a message to other drawers in the system to determine if a line of the data stored by the evacuating drawer 410 has been modified in cache of another drawer. If another drawer has modified a line in cache, then the evacuating drawer 410 may need to retrieve the modified line from the other drawer so that it can be sent to the destination drawer 420. In some embodiments, the evacuating drawer 410 may receive the modified versions of data from the cache owning drawer 510. The evacuating drawer can transmit the stored data by evacuating drawer 410 and any modified versions of data received from the cache owning drawer 510 to the destination drawer 420 for storage. Because non-DMR operations of the evacuating drawer 410 have been halted during the evacuation mode, there is no other use for the bus connecting the evacuating drawer 410 to the cache owning drawer 510, other than for performing DMR/memory move operations, and thus there is no loss of bandwidth to this bus by using it for DMR operations. However, as explained previously, the bus connecting the destination drawer 420 to the cache owning drawer 510 may generally be required for other non-DMR uses, and so shifting such DMR operations away from this bus to the bus between the evacuating drawer 410 and cache owning drawer 510 provides the benefit of increasing the bandwidth on the former for non-DMR operations.

According to some embodiments, prior to performing memory move operations, the evacuating drawer 410 may first determine what data is stored in memory of the evacuating drawer 410 and identify one or more appropriate destination drawers to send the data to. In other words, although the previous examples have described the memory move operations as being between an evacuating drawer 410 and a destination drawer 420, in some embodiments it may be the case that the system may determine to move some of the stored data to a first destination drawer and some of the stored data to one or more second destination drawers. For example, a five drawer system 100 may run multiple virtual machines that are spread across multiple drawers such that the evacuation drawer may store a first set of data that is used with a first virtual machine that is executed on a first drawer and second set of data that is used with a second virtual machine that is executed on a second drawer. In this case, the evacuating drawer may determine that the first set of data should be moved to the first destination drawer and the second set of data should be moved to the second destination drawer. Thus, according to some embodiments, the local pool of fetch/store controllers 412 of the evacuating drawer 410 may communicate with a first group of remote fetch/store controllers of the first destination drawer and a first group of remote fetch/store controllers of the second destination drawer to perform the memory move operations.

Figure 8:
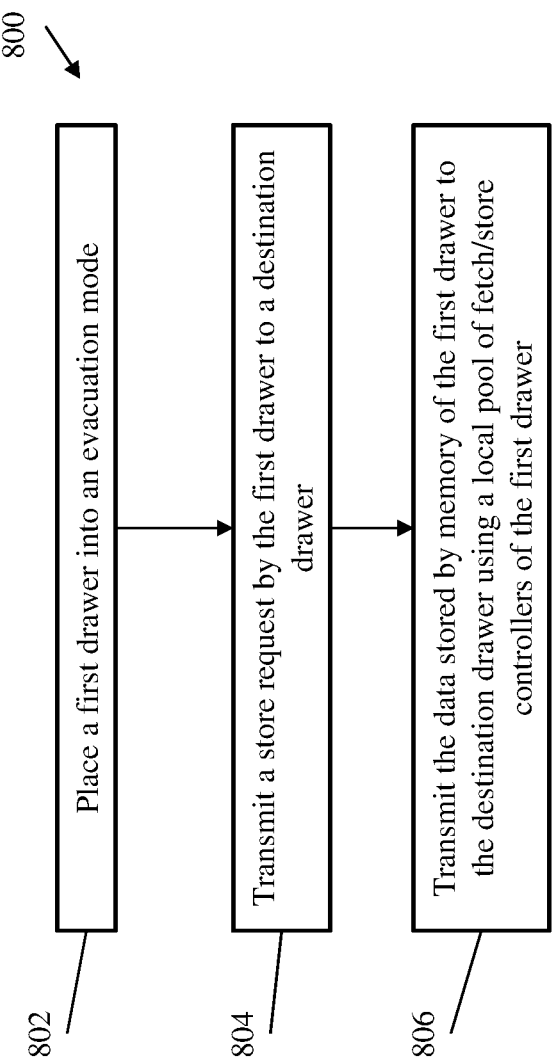
FIG. 8 depicts a flow diagram of a method for evacuating memory from a drawer in a live multi-node system according to one or more embodiments of the invention.

Turning now to FIG. 8, a flow diagram of a method 800 for evacuating memory from a drawer in a live multi-node system in accordance with an embodiment is shown. In one or more embodiments of the present invention, the method 800 may be embodied in hardware and software that is executed by computer elements located within a system 100, such as one or more drawers (e.g., drawer 102) as illustrated in FIGS. 1 and 2. According to some embodiments, decisions or operations that are performed in accordance with the method may be carried out by hardware elements and/or in accordance with software instructions. In some embodiments, the computer elements may reside on a computer system or processing system, such as the processing system 300 described herein above and illustrated in FIG. 3, or in some other type of computing or processing environment.

The method 800 begins at block 802 and includes placing a first drawer (e.g., evacuation drawer 410 in FIG. 6) into an evacuation mode. For example, the system may place the first drawer into an evacuation mode upon determining that multiple similar errors exist in a piece of hardware or any other such error or issue that may be negatively impacting the performance of the drawer. The evacuation mode includes a cessation of non-evacuation operations and provides for a transfer of data stored by memory of the first drawer to a destination drawer using dynamic memory reallocation (DMR). In other word, when in evacuation mode, the only operations that may be executed by the drawer may be operations that relate to transferring data from the memory of the drawer to a memory of another drawer, whereas other operations such as for example but not limited to, processor core fetch requests and processor core store requests, may cease or be prevented from being executed. According to some embodiments, the first drawer includes a local pool of fetch/store controllers (e.g., controllers 412 in FIG. 6) configured to interact with a group of remote fetch/store controllers of the destination drawer (e.g., controllers 424 in FIG. 6), a first group of remote fetch/store controllers (e.g., controllers 416 in FIG. 6) configured to interact with a local pool of fetch/store controllers of the destination drawer, and a second group of remote fetch/store controllers (e.g., controllers 418 in FIG. 6) configured to interact with a local pool of fetch/store controllers of a second drawer. According to some embodiments, the pool of local fetch/store controllers of the first drawer includes a plurality of fetch controllers and a plurality of store controllers. According to some embodiments, each fetch controller may be configured to perform one fetch operation at a time and each store controller is configured to perform on store operation at a time.

As shown at block 804, the method includes transmitting a store request by the first drawer to the destination drawer. The store request can represent a request to transfer the data stored by the memory of the first drawer to the destination drawer for storage by the destination drawer. According to some embodiments, the destination drawer may send a response to the first drawer confirming that it received the request and the first drawer may then send data to the destination drawer. The destination drawer may receive the data, send it to memory on the destination drawer and receive a completion confirmation from memory and then the destination drawer may send a completion response to the first drawer.

As shown at block 806, the method includes transmitting the data stored by the memory of the first drawer to the destination drawer. According to some embodiments, the data can be transferred by the first drawer using the local pool of fetch/store controllers. In other words, the evacuating drawer may originate instructions (e.g., via CP chip(s), SC chip, or other error tracking devices) for the local pool of fetch/store controllers to execute to carry out the transfer of stored data to the destination drawer. In some cases, as described above, the evacuating drawer may fetch modified versions of data stored in cache of another drawer and send this modified data to the destination drawer as well. In some embodiments, each line of data stored by memory of the first drawer can be fetched from memory and transmitted to the destination drawer using one local fetch/store controller pair of the local pool of fetch/store controllers of the first drawer. In some embodiments, the local pool of fetch/store controllers of the first drawer may interact with a group of remote fetch/store controllers of the destination drawer. As will be understood by those of skill in the art, the group of remote fetch/store controllers on the destination drawer may receive and store the data to memory of the destination drawer.

According to some embodiments, the local pool of fetch/store controllers of the first drawer may only be used for DMR-related operations during an evacuation of the first drawer. In some embodiments, the local pool of fetch/store controllers of the destination drawer may only be used for non-DMR-related operations during an evacuation of the first drawer. In some embodiments, the first and second groups of remote fetch/store controllers of the first drawer can be idle during an evacuation of the first drawer. In some embodiments, buses connecting the destination drawer to the second drawer, a third drawer and a fourth drawer are not used for DMR-related operations during an evacuation of the first drawer. As described previously with respect to FIGS. 4-7, embodiments of the invention utilize otherwise idle resources of the evacuating drawer (e.g., local controllers and buses to other drawers storing modified data) while increasing the availability of resources that have non-DMR demands (e.g., local controllers of the destination drawer and buses between the destination drawer and other drawers storing modified data), allowing for a much faster and more efficient transfer of data and overall increase in resource utilization.

According to some embodiments, the method 800 may further include determining what data is stored by memory of the first drawer and selecting the destination drawer from a plurality of other drawers based on the determination of what data is stored by the memory of the first drawer. As described previously above, data stored by the evacuating drawer may be associated with applications run on different drawers, and thus, in some cases data may be sent to different respective drawers in a manner determined by the system to provide the most effective distribution of data. As will be appreciated by those of skill in the art, it is generally desirably to store data closest in proximity to the elements that will utilize the data during the execution of processes, and thus, in some embodiments, the evacuating drawer may determine which data to send to which drawers on this or some other basis prior to transmitting the data.

In some embodiments, the method 800 may further include transmitting a fetch request by the first drawer (e.g., the evacuating drawer 410) to the second drawer (e.g., the cache owning drawer 510). As previously described above with respect to FIG. 7, a fetch request can represent a request to fetch a modified version of data stored by memory of the first drawer from a cache of the second drawer. The method may also include receiving the modified version of data by the first drawer from the second drawer and storing the modified version of data in memory of the first drawer and/or transmitting the modified version of data to the destination drawer (e.g., using the local pool of fetch/store controllers of the first drawer).

Additional processes may also be included. It should be understood that the process depicted in FIG. 8 represents an illustration, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   placing a first drawer into an evacuation mode, the evacuation mode comprising a cessation of non-evacuation operations and providing for a transfer of all data stored by memory of the first drawer to a destination drawer using dynamic memory reallocation (DMR), wherein the first drawer comprises:
      a local pool of fetch/store controllers configured to interact with a group of remote fetch/store controllers of the destination drawer;
      a first group of remote fetch/store controllers configured to interact with a local pool of fetch/store controllers of the destination drawer; and
      a second group of remote fetch/store controllers configured to interact with a local pool of fetch/store controllers of a second drawer;
   transmitting, by the first drawer to the destination drawer, a store request, wherein the store request represents a request to transfer the data stored by the memory of the first drawer to the destination drawer for storage by the destination drawer; and
   in response to transmitting the store request, transmitting, by the first drawer using the local pool of fetch/store controllers of the first drawer, the data stored by the memory of the first drawer to the destination drawer, the transmitting via the remote fetch store controllers of the destination device,
   wherein prior to placing the first drawer into the evacuation mode, the local pool of fetch/store controllers of the destination drawer are used to fetch the data stored by the memory of the first drawer in response to the destination drawer receiving the store request from the first drawer, the fetching via the first group of remote fetch/store controllers of the first drawer.

2. The computer-implemented method of claim 1, further comprising:
   determining what data is stored by memory of the first drawer; and
   selecting the destination drawer from a plurality of other drawers based on the determination of what data is stored by the memory of the first drawer.

3. The computer-implemented method of claim 1, wherein each line of data stored by memory of the first drawer is fetched from memory and transmitted to the destination drawer using one local fetch/store controller pair of the local pool of fetch/store controllers of the first drawer.

4. The computer-implemented method of claim 1, wherein the local pool of fetch/store controllers of the first drawer is only used for DMR-related operations during an evacuation of the first drawer.

5. The computer-implemented method of claim 1, wherein the local pool of fetch/store controllers of the destination drawer are used for non-DMR-related operations during an evacuation of the first drawer.

6. The computer-implemented method of claim 1, wherein the first and second groups of remote fetch/store controllers of the first drawer are idle during an evacuation of the first drawer.

7. The computer-implemented method of claim 1, wherein buses connecting the destination drawer to the second drawer, a third drawer and a fourth drawer are not used for DMR-related operations during an evacuation of the first drawer.

8. The computer-implemented method of claim 1, wherein the pool of local fetch/store controllers of the first drawer comprises:

a plurality of fetch controllers, wherein each fetch controller is configured to perform one fetch operation at a time; and a plurality of store controllers, wherein each store controller is configured to perform one store operation at a time.

9. The computer-implemented method of claim 1, further comprising:

transmitting, by the first drawer to the second drawer, a fetch request, wherein the fetch request represents a request to fetch a modified version of data stored by memory of the first drawer from a cache of the second drawer;

receiving, by the first drawer from the second drawer, the modified version of data; and storing the modified version of data in memory of the first drawer.

10. The computer-implemented method of claim 9, further comprising transmitting, by the first drawer using the local pool of fetch/store controllers, the modified version of data to the destination drawer.

11. A system comprising:

a processor communicatively coupled to a memory, the processor configured to:

place a first drawer into an evacuation mode, the evacuation mode comprising a cessation of non-evacuation operations and providing for a transfer of all data stored by memory of the first drawer to a destination drawer using dynamic memory reallocation (DMR), wherein the first drawer comprises:

a local pool of fetch/store controllers configured to interact with a group of remote fetch/store controllers of the destination drawer;

a first group of remote fetch/store controllers configured to interact with a local pool of fetch/store controllers of the destination drawer; and a second group of remote fetch/store controllers configured to interact with a local pool of fetch/store controllers of a second drawer;

transmit, by the first drawer to the destination drawer, a store request, wherein the store request represents a request to transfer the data stored by the memory of the first drawer to the destination drawer for storage by the destination drawer; and in response to transmitting the store request, transmit, by the first drawer using the local pool of fetch/store controllers of the first drawer, the data stored by the memory of the first drawer to the destination drawer, the transmitting via the remote fetch store controllers of the destination device, wherein prior to placing the first drawer into the evacuation mode, the local pool of fetch/store controllers of the destination drawer are used to fetch the data stored by the memory of the first drawer in response to the destination drawer receiving the store request from the first drawer, the fetching via the first group of remote fetch/store controllers of the first drawer.

12. The system of claim 11, the processor being further configured to:

determine what data is stored by memory of the first drawer; and select the destination drawer from a plurality of other drawers based on the determination of what data is stored by the memory of the first drawer.

13. The system of claim 11, wherein each line of data stored by memory of the first drawer is fetched from memory and transmitted to the destination drawer using one local fetch/store controller pair of the local pool of fetch/store controllers of the first drawer.

14. The system of claim 11, wherein the local pool of fetch/store controllers of the first drawer is only used for DMR-related operations during an evacuation of the first drawer.

15. The system of claim 11, wherein the local pool of fetch/store controllers of the destination drawer are used for non-DMR-related operations during an evacuation of the first drawer.

16. The system of claim 11, wherein the first and second groups of remote fetch/store controllers of the first drawer are idle during an evacuation of the first drawer.

17. A computer program product comprising a computer readable storage medium having program instructions embodied therewith the program instructions executable by a computer processor to cause the computer processor to perform a method comprising:

placing a first drawer into an evacuation mode, the evacuation mode comprising a cessation of non-evacuation operations and providing for a transfer of all data stored by memory of the first drawer to a destination drawer using dynamic memory reallocation (DMR), wherein the first drawer comprises:

a local pool of fetch/store controllers configured to interact with a group of remote fetch/store controllers of the destination drawer;

a first group of remote fetch/store controllers configured to interact with a local pool of fetch/store controllers of the destination drawer; and a second group of remote fetch/store controllers configured to interact with a local pool of fetch/store controllers of a second drawer;

transmitting, by the first drawer to the destination drawer, a store request, wherein the store request represents a request to transfer the data stored by the memory of the first drawer to the destination drawer for storage by the destination drawer; and in response to transmitting the store request, transmitting, by the first drawer using the local pool of fetch/store controllers of the first drawer, the data stored by the memory of the first drawer to the destination drawer, the transmitting via the remote fetch store controllers of the destination device, wherein prior to placing the first drawer into the evacuation mode, the local pool of fetch/store controllers of the destination drawer are used to fetch the data stored by the memory of the first drawer in response to the destination drawer receiving the store request from the first drawer, the fetching via the first group of remote fetch/store controllers of the first drawer.

18. The computer program product of claim 17, wherein the method further comprises:

determining what data is stored by memory of the first drawer; and selecting the destination drawer from a plurality of other drawers based on the determination of what data is stored by the memory of the first drawer.

19. The computer program product of claim 17, wherein each line of data stored by memory of the first drawer is fetched from memory and transmitted to the destination drawer using one local fetch/store controller pair of the local pool of fetch/store controllers of the first drawer.

20. The computer program product of claim 17, wherein the local pool of fetch/store controllers of the first drawer is only used for DMR-related operations during an evacuation of the first drawer.

* * * * *